US009686437B2

(12) United States Patent
Rodriguez et al.

(10) Patent No.: US 9,686,437 B2
(45) Date of Patent: Jun. 20, 2017

(54) RELAY DEVICE FOR IMAGE FORMING APPARATUS

(71) Applicant: KYOCERA Document Solutions Inc., Osaka-shi, Osaka (JP)

(72) Inventors: Jason Rodriguez, Osaka (JP); Cedric Sarigumba, Osaka (JP); Cara Tilos, Cebu (PH); Maria Luisa Exaltacion, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/098,220

(22) Filed: Apr. 13, 2016

(65) Prior Publication Data

US 2016/0337547 A1  Nov. 17, 2016

(30) Foreign Application Priority Data

May 11, 2015  (JP) ................. 2015-096853

(51) Int. Cl.
*H04N 1/32* (2006.01)
*H04B 7/155* (2006.01)
*H04W 4/14* (2009.01)
*H04N 1/00* (2006.01)
*H04N 1/327* (2006.01)

(52) U.S. Cl.
CPC ......... *H04N 1/32101* (2013.01); *H04B 7/155* (2013.01); *H04N 1/00307* (2013.01); *H04N 1/00312* (2013.01); *H04N 1/32771* (2013.01); *H04W 4/14* (2013.01); *H04N 2201/0072* (2013.01); *H04N 2201/0094* (2013.01); *H04N 2201/3204* (2013.01)

(58) Field of Classification Search
CPC .................................................. H04N 1/32101
USPC ....................................................... 358/1.15
See application file for complete search history.

(56) References Cited

U.S. PATENT DOCUMENTS

| 2004/0137928 | A1  | 7/2004  | Biundo |
|---|---|---|---|
| 2008/0225329 | A1* | 9/2008  | Tanaka ................. G06F 3/1203 358/1.15 |
| 2014/0368867 | A1* | 12/2014 | Kim ..................... G06F 3/1204 358/1.15 |
| 2015/0092233 | A1* | 4/2015  | Park .................... G06F 3/1288 358/1.15 |
| 2015/0220816 | A1* | 8/2015  | Gregory ................ H04W 4/12 705/15 |

FOREIGN PATENT DOCUMENTS

JP  2004220607 A  8/2004

* cited by examiner

*Primary Examiner* — Jacky X Zheng
(74) *Attorney, Agent, or Firm* — Alleman Hall Creasman & Tuttle LLP

(57) ABSTRACT

A relay device includes a first communication portion, a second communication portion, a request message reception portion, a request command transmission portion, a request information reception portion, and a request information transmission portion. The relay device receives a request message from a mobile terminal through a first communication network, transmits a request command corresponding to the request message to the image forming apparatus through a second communication network, and transmits information containing information of an apparatus status received from the image forming apparatus to the mobile terminal.

4 Claims, 6 Drawing Sheets

FIG. 6

(Ex1) D1→ <STATUS> MODE <DEVICE> prn0123
         T1      T2      T3      T4

(Ex2) <STATUS> TONER <DEVICE> prn0123 <SUBSCRIBE> 7 days
                                       T5           T6

(Ex3) <STATUS> TONER; PAPER <DEVICE> prn0123 <SUBSCRIBE> Friday
              T2                                          T6

(Ex4) <STATUS> ERROR <DEVICE> prn0123

(Ex5) <STATUS> ALL <DEVICE> prn0123 <SUBSCRIBE> First Monday
                                                 T6

(Ex6) <STATUS> ERROR <DEVICE> prn0123 <SUBSCRIBE> 1houre / ERROR
                                                  T6       T7

FIG. 7

```
STATUS REPORT  2015/05/06 19:00       D4

Device Code  : prn0123
Model Name   : Cygnus
Toner status :           D3
      Black(80%)
      Cyan(50%)
      Magenta(35%)
      Yellow(46%)
```

RELAY DEVICE FOR IMAGE FORMING APPARATUS

INCORPORATION BY REFERENCE

This application is based upon and claims the benefit of priority from the corresponding Japanese Patent Application No. 2015-096853 filed on May 11, 2015, the entire contents of which are incorporated herein by reference.

BACKGROUND

The present disclosure relates to a relay device for an image forming apparatus.

Generally, an image forming apparatus is capable of communicating with information processing apparatuses such as a personal computer over a network such as a LAN (Local Area Network). Examples of the image forming apparatus include a printer and a multifunctional peripheral having the function of a printer.

In addition to a function of receiving print data, the image forming apparatus often has a function of notifying its own status such as shortage of a developer to the information processing apparatus over a network. For such cases, dedicated software such as a printer driver supporting the intended image forming apparatus has to be preinstalled on the information processing apparatus.

The information processing apparatus that has been preinstalled with the dedicated software acquires the apparatus status from the image processing apparatus in accordance with a predetermined communication procedure.

Furthermore, using a mobile phone to receive a message including settings information of a printer on the mobile phone and determine print settings based on the received settings information is known.

SUMMARY

A relay device for an image forming apparatus according to one aspect of the present disclosure includes a first communication portion, a second communication portion, a request message reception portion, a request command transmission portion, a request information reception portion, and a request information transmission portion. The first communication portion is configured to conduct communication through a first communication network including a public wireless network. The second communication portion is configured to conduct communication through a second communication network which is different from the first communication network. The request message reception portion is configured to receive a request message requesting information about an apparatus status of the image forming apparatus from a mobile terminal through the first communication portion. The request command transmission portion is configured to transmit a request command corresponding to the request message to the image forming apparatus through the second communication portion. The request information reception portion is configured to receive, through the second communication portion, the information about the apparatus status transmitted as a response from the image forming apparatus in response to the transmitted request command. The request information transmission portion is configured to transmit, through the first communication portion, the information about the apparatus status received from the image forming apparatus to the mobile terminal which is a transmission source of the request message.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows one example of a request message received by the relay device according to the embodiment.

FIG. 7 shows one example of a report message transmitted by the relay device according to the embodiment.

DETAILED DESCRIPTION

Hereinafter, embodiments of the present disclosure will be described with reference to the accompanying drawings. It should be noted that the following embodiments are examples realizing the present disclosure and do not limit the technical scope of present disclosure.

[Configuration of Apparatus Status Relay System]

Firstly, with reference to FIG. 1, the configuration of an apparatus status relay system 100 including a relay device 10 according to one embodiment will be described.

Figure 1:
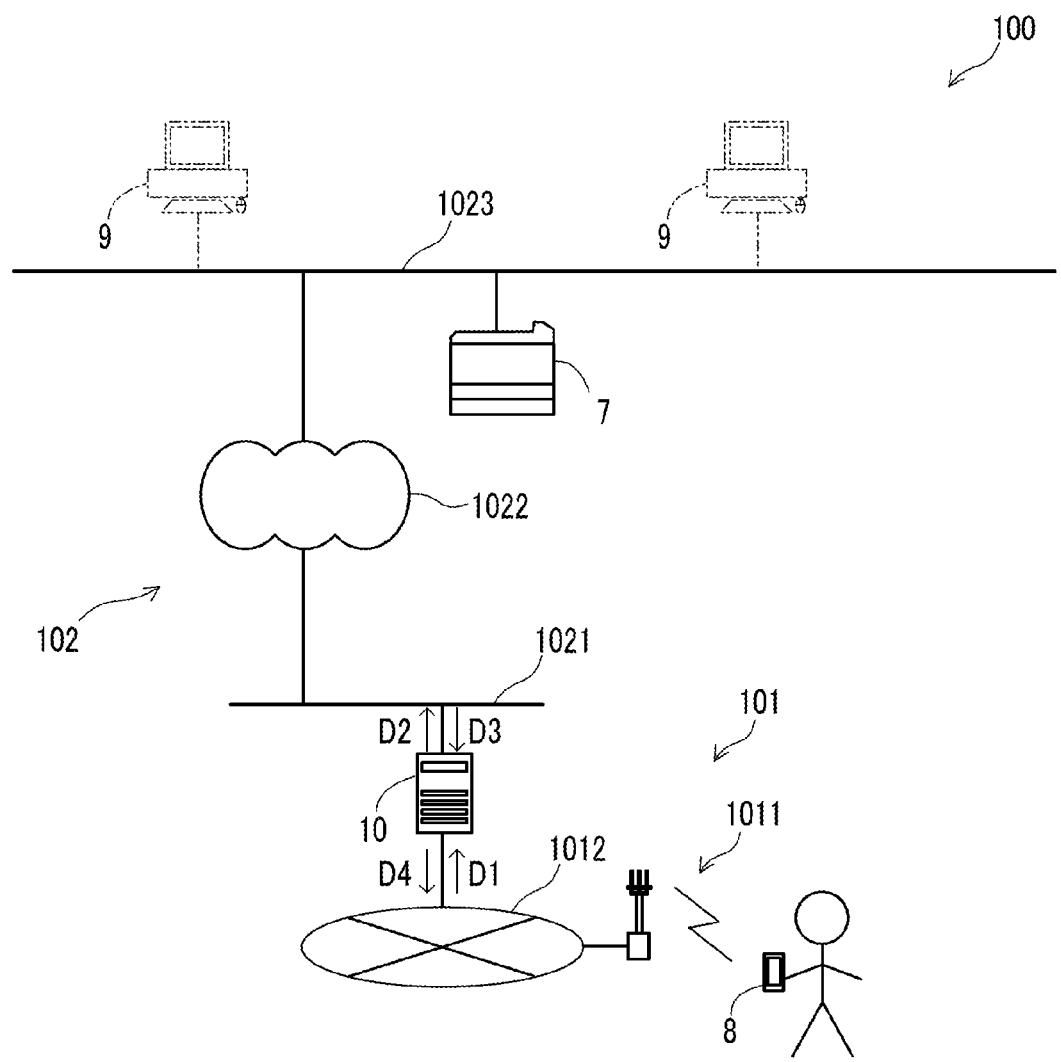
FIG. 1 is a configuration diagram of an apparatus status relay system including a relay device according to one embodiment.

As shown in FIG. 1, the apparatus status relay system 100 includes an image forming apparatus 7, the relay device 10, and a mobile terminal 8. The apparatus status relay system 100 is a system in which an apparatus status of the image forming apparatus 7 is requested from the mobile terminal 8 to the image forming apparatus 7 via the relay device 10, and is transmitted from the image forming apparatus 7 to the mobile terminal 8 via the relay device 10.

The relay device 10 is capable of communicating with the mobile terminal 8 through a first communication network 101 including a public wireless network. For example, the first communication network 101 is conceivably a public telephone line including a wireless telephone network 1011 and a fixed telephone line 1012.

The wireless telephone network 1011 is connected to the fixed telephone line 1012 via a wireless base station or the like. The public telephone line establishes a one-to-one communication link.

The mobile terminal 8 and the relay device 10 can transmit and receive messages between each other using SMS (Short Message Service) communication.

In addition, the relay device 10 is capable of communicating with the image forming apparatus 7 through a second communication network 102 which is a communication network including LANs 1021 and 1023. The second communication network 102 and the first communication network 101 are different lines.

For example, the second communication network 102 conceivably includes a first LAN 1021 having the relay device 10 as a node, a second LAN 1023 having the image forming apparatus 7 as a node, and an Internet 1022 connecting the first LAN 1021 and the second LAN 1023. A local terminal 9 that transmits print data to the image forming apparatus 7 is also one node of the second LAN 1023.

[Relay Device 10]

Figure 2:
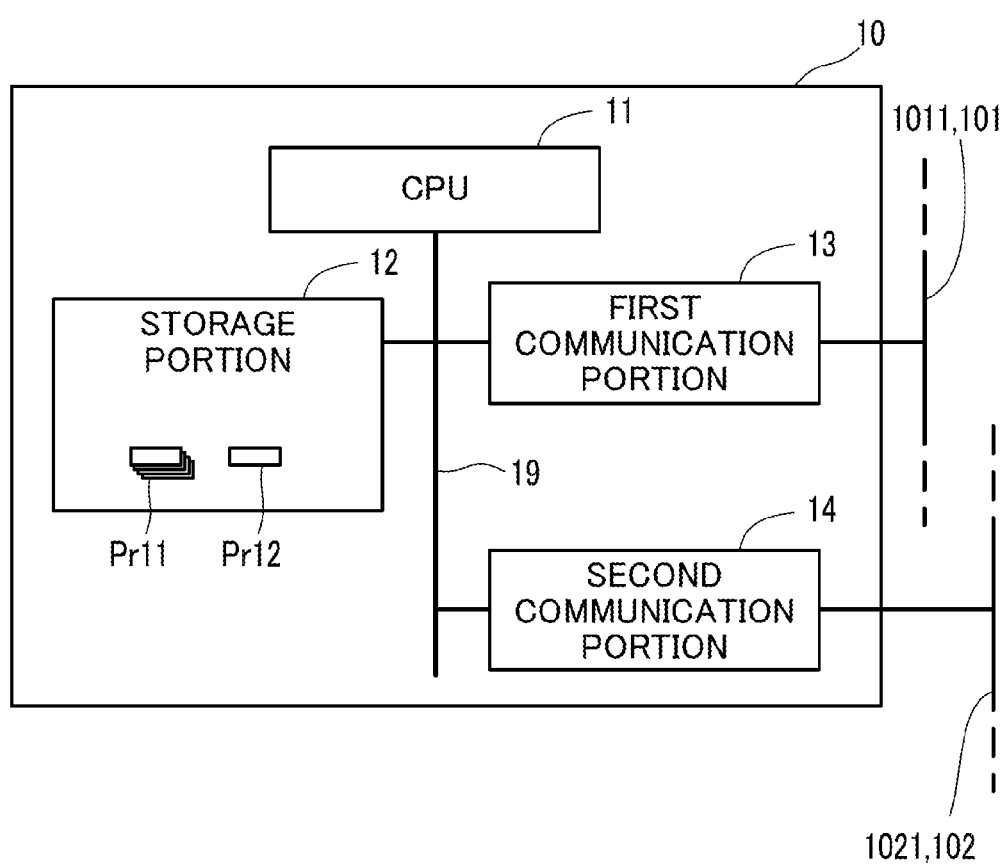
FIG. 2 is a block diagram of the relay device according to the embodiment.

Next, with reference to FIG. 2, the configuration of the relay device 10 will be described. The relay device 10 includes a CPU (Central Processing Unit) 11, a storage portion 12, a first communication portion 13, and a second communication portion 14, etc.

The CPU 11 is a processor configured to execute various calculations and data processing related to relaying of data between the image forming apparatus 7 and the mobile terminal 8. The storage portion 12 is a nonvolatile storage portion configured to store various types of data referred to by the CPU 11. Furthermore, the storage portion 12 is also a storage portion from/to which the CPU 11 can read and write various types of data.

The storage portion 12 also stores a program for causing the CPU 11 to execute various types of processes. The relay device 10 also includes a volatile storage portion, which is not shown, such as a RAM configured to temporarily store a program executed by the CPU 11.

The first communication portion 13 is a communication interface configured to transmit and receive data to and from the mobile terminal 8 through the first communication network 101. The first communication portion 13 in the present embodiment is a modem or the like connected to the fixed telephone line 1012.

The second communication portion 14 is a communication interface configured to conduct data communication with the image forming apparatus 7 through the second communication network 102. The second communication portion 14 in the present embodiment is a LAN interface module connected to the first LAN 1021.

The CPU 11, the storage portion 12, the first communication portion 13, and the second communication portion 14 are capable of transferring data among each other through a bus 19.

The CPU 11 conducts SMS communication through the first communication portion 13 by executing an SMS program Pr11 stored in the storage portion 12. With this, the CPU 11 transmits and receives messages to and from the mobile terminal 8 by using SMS communication.

[Image Forming Apparatus 7]

The image forming apparatus 7 is an apparatus having a function of a printer configured to form on a sheet material an image based on print data received from the local terminal 9. The image forming apparatus 7 may also conceivably be a copy machine additionally including a scanner configured to read an image on a document sheet. In such a case, the image forming apparatus 7 forms an image read from the document sheet on the sheet material. The image forming apparatus 7 may also conceivably be a multifunctional peripheral additionally having other functions such as a facsimile function.

The image forming apparatus 7 includes a main control portion 71, a printing portion 72, a printing control portion 73, an image processing portion 74, a communication portion 75, and an operation display portion 76, etc.

The main control portion 71, the printing control portion 73, the image processing portion 74, and the communication portion 75 are capable of transferring data among each other through a bus 79.

The printing portion 72 forms an image on the sheet material medium by using a commonly known electrophotographic type image formation process. The printing portion 72 includes an image carrier and peripheral devices thereof, which are not shown, and transfers an image of a developer onto the sheet material from the image carrier and fixes the image by applying heat to the sheet material.

The printing control portion 73 acquires image data for printing from the image processing portion 74, and causes the printing portion 72 to execute the printing process of forming, on the sheet material, an image based on the image data for printing.

The image processing portion 74 executes various types of data processing with respect to image data or the like obtained from other instruments through the bus 79. Examples of subjects for data processing performed by the image processing portion 74 include print data obtain from the local terminal 9 through the communication portion 75.

For example, the image processing portion 74 converts image data contained in the print data into the image data for printing. At that moment, the image processing portion 74 performs image processing such as image rotation, halftoning, and size reduction with respect to the image data.

The communication portion 75 transmits and receives data to and from an external device such as the relay device 10 and the local terminal 9 through the second communication network 102.

The operation display portion 76 includes an operation portion for input of information such as, for example, a touch panel and an operation button, and a display portion having a liquid crystal display panel and a notification lamp, etc.

Figure 3:
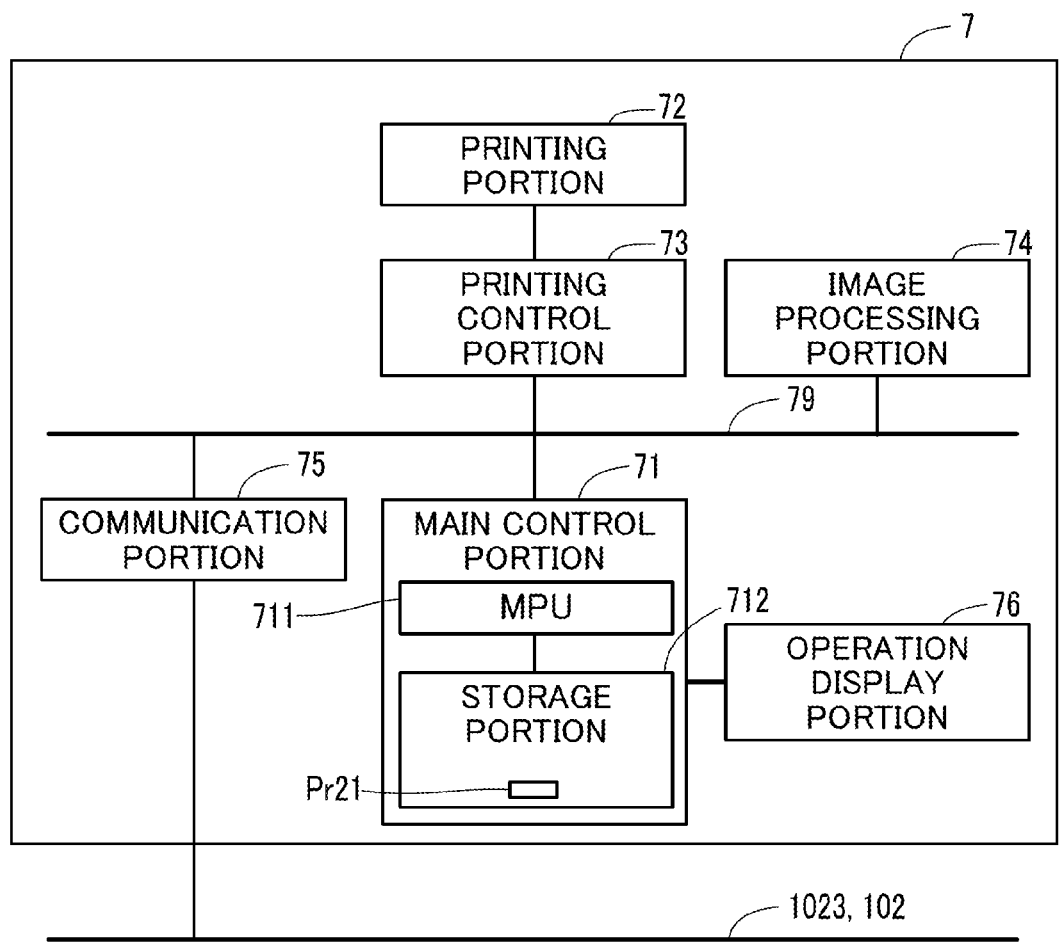
FIG. 3 is a block diagram of an image forming apparatus.

The main control portion 71 is configured to integrally control other control portions. For example, the main control portion 71 causes the operation display portion 76 to display an operation menu or the like. Furthermore, the main control portion 71 outputs a control instruction to other control portions in accordance with input information inputted through operation performed on the operation display portion 76 and sensing results from various types of sensors. As shown in FIG. 3, the main control portion 71 includes an MPU (Micro Processor Unit) 711 and a storage portion 712.

The MPU 711 is a processor configured to execute various calculations and data processing. The storage portion 712 is a nonvolatile storage portion configured to store various types of information referred to by the MPU 711. Furthermore, the storage portion 712 is also a storage portion from/to which the MPU 711 can read and write various types of information.

The storage portion 712 also stores a program for causing the MPU 711 to execute various types of processes. The main control portion 71 also includes a volatile storage portion, which is not shown, such as a RAM configured to temporarily store a program executed by the MPU 711.

The image forming apparatus 7 has a function of notifying its own status such as shortage of a developer to the local terminal 9 through the second LAN 1023. A printer driver, which is dedicated software supporting the image forming apparatus 7 that becomes a communication partner, is preinstalled in the local terminal 9. The local terminal 9, by executing the printer driver, transmits print data to the image forming apparatus 7 and receives information of the apparatus status from the image forming apparatus 7.

[Mobile Terminal 8]

The mobile terminal 8 is a portable information processing apparatus such as a smart phone, a tablet computer, or a wearable computer. The mobile terminal 8 is an information processing apparatus that is to be carried by such as an administrator or a maintenance staff of the image forming apparatus 7.

Figure 4:
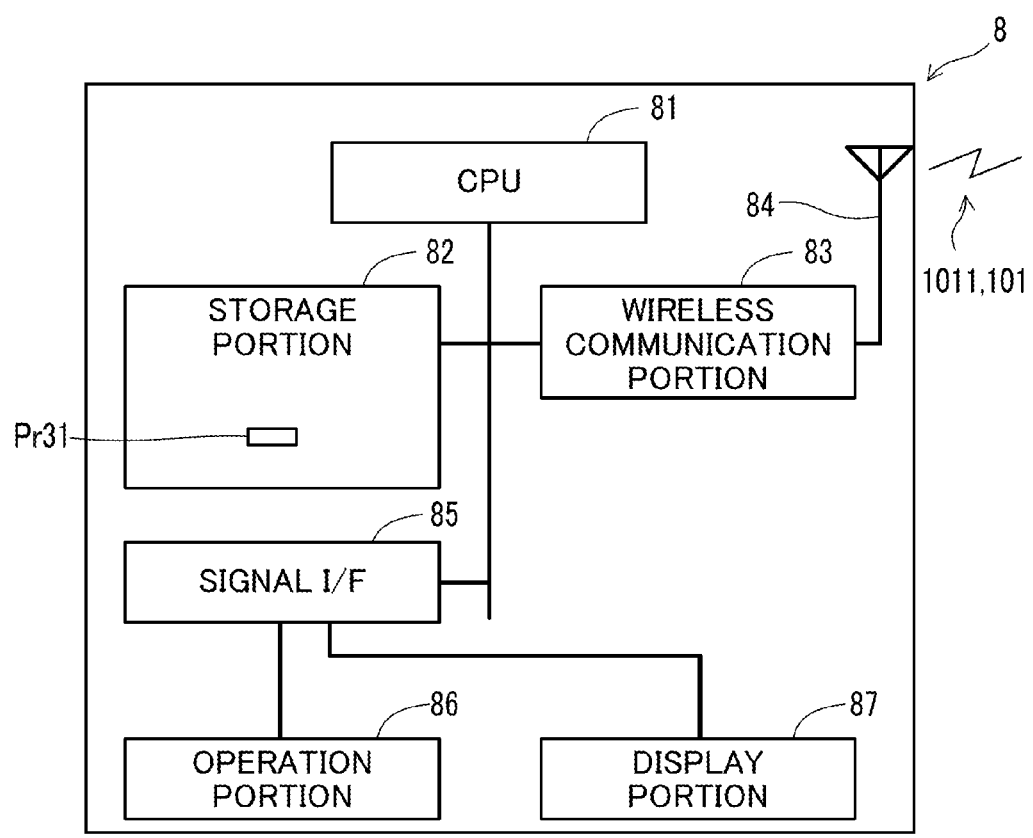
FIG. 4 is a block diagram of a mobile terminal.

As shown in FIG. 4, the mobile terminal 8 includes a CPU 81, a storage portion 82, a wireless communication portion 83, an antenna 84, a signal interface 85, an operation portion 86, and a display portion 87.

The CPU 81 is a processor configured to execute various calculations and data processing. The storage portion 82 is a nonvolatile storage portion configured to store various types of data referred to by the CPU 81. Furthermore, the storage portion 82 is also a storage portion from/to which the CPU 81 can read and write various types of data.

The storage portion 82 also stores a program for causing the CPU 81 to execute various types of processes. The mobile terminal 8 also includes a volatile storage portion, which is not shown, such as a RAM configured to temporarily store a program executed by the CPU 81.

The wireless communication portion 83 is a wireless-communication interface that transmits and receives data to and from the relay device 10 through the first communication network 101. The wireless communication portion 83 transmits and receives wireless radio waves through the antenna 84.

For example, the wireless communication portion 83 conducts wireless communication in accordance with communication protocols such as GSM (Global System for Mobile Communications) method, CDMA (Code Division Multiple Access) method, or W-CDMA (Wideband Code Division Multiple Access) method. The CPU 81 transmits and receives data to and from the relay device 10 through the wireless communication portion 83.

The operation portion 86 is an information input portion including, for example, a touch panel and an operation button. The display portion 87 is a display panel such as a liquid crystal display panel. The CPU 81 conducts data processing based on an instruction or data inputted through the operation portion 86. Furthermore, the CPU 81 outputs an operation screen or a screen displaying a result of data processing on the display portion 87.

The CPU 81 conducts SMS communication through the wireless communication portion 83 by executing a SMS application Pr31 which is a program stored in the storage portion 82. With this, the CPU 81 transmits and receives messages to and from the relay device 10 by using SMS communication.

In some cases, a person such as the administrator or the maintenance staff of the image forming apparatus 7 may wish to confirm the apparatus status of the image forming apparatus 7 when the local terminal 9 installed with the printer driver is unusable.

For example, the administrator may wish to confirm the apparatus status of an image forming apparatus 7 placed at a branch office. In addition, the maintenance staff may wish to confirm the apparatus status of various types of image forming apparatuses 7 placed at a location to which he/she has been dispatched.

However, a less-expensive version of the image forming apparatus 7 has a simplified device configuration and is low in specification, and does not have various communication functions for selecting different communication interfaces or communication procedures depending on a communication partner.

In the present embodiment, the relay device 10 that is configured to execute a later described apparatus status relaying process is employed. With this, the user can acquire the apparatus status of the image forming apparatus 7 simply, without using the local terminal 9 installed with the printer driver supporting the intended image forming apparatus 7.

[Apparatus Status Relaying Process]

Figure 5:
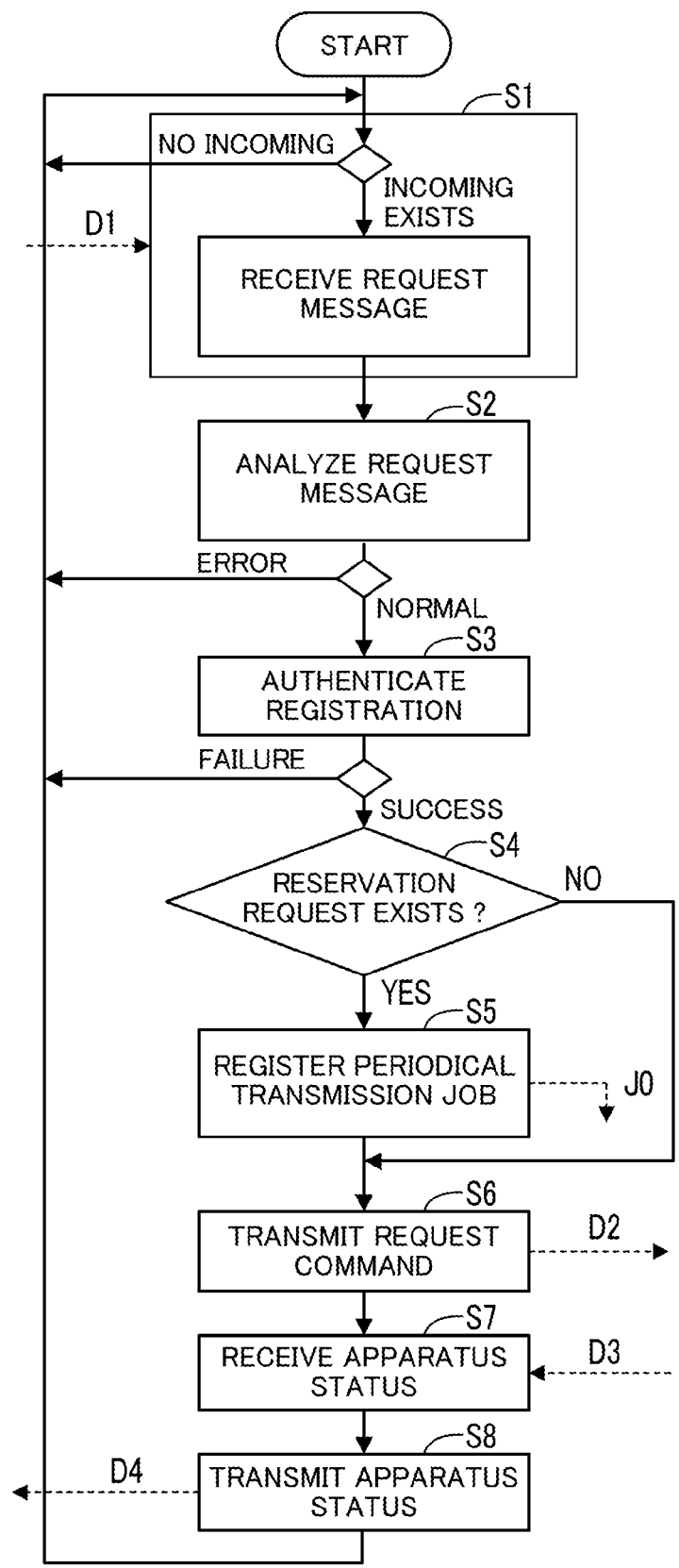
FIG. 5 is a flowchart showing one example of procedures of an apparatus status relaying process executed by the relay device according to the embodiment.

In the following, one example of the procedures of the apparatus status relaying process executed by the relay device 10 will be described with reference to the flowchart shown in FIG. 5. In the following description, S1, S2 . . . represent identification characters of respective steps executed by the CPU 11 of the relay device 10.

<Step S1>

In the apparatus status relaying process, the CPU 11 of the relay device 10 monitors whether or not there is an incoming of a request message D1 from the mobile terminal 8. When there is an incoming of the request message D1, the CPU 11 receives the request message D1 from the mobile terminal 8 through the first communication network 101.

In the present embodiment, the request message D1 is an SMS message. It should be noted that the CPU 11 that is configured to execute the process at step S1 is one example of a request message reception portion. The process at step S1 is achieved when the CPU 11 executes the SMS program Pr11.

<Step S2>

Next, the CPU 11 analyzes the contents of the received request message D1. The request message D1 is a message whose writing rule is determined in advance.

At step S2, the CPU 11 analyzes whether or not the received request message D1 is written in accordance with the writing rule. Furthermore, when the request message D1 is written in accordance with the writing rule, the CPU 11 analyzes a request content described in the request message D1.

FIG. 6 shows one example of the request message D1 received by the relay device. First to sixth examples Ex1 to Ex6 in FIG. 6 are each an example of the request message D1 in accordance with the writing rule.

As shown in FIG. 6, the request message D1 includes a status tag T1, a first element T2 corresponding to the status tag T1, an apparatus tag T3, and a second element T4 corresponding to the apparatus tag T3.

The status tag T1 is a tag showing that the type of the apparatus status of the requested image forming apparatus 7 is identified by the first element T2 described next. For example, the first element T2 is conceivably one or more selected from "MODE," "TONER," and "PAPER."

"MODE" represents a request of an operation mode of the image forming apparatus 7. The operation mode is, for example "normal mode" or "power saving mode." "TONER" represents a request of the remaining level of developer in the image forming apparatus 7. "PAPER" represents a request of the remaining level of the sheet material in the image forming apparatus 7.

Furthermore, the first element T2 may also conceivably be "ERROR" or "ALL." "ERROR" represents a request of the contents of an error occurring in the image forming apparatus 7. For example, the contents of the error is conceivably jamming of the sheet material and the remaining level of the supply material in the image forming apparatus 7 being less than a predetermined lower limit. Examples of the supply material include the developer and the sheet material.

Another example of the error is accumulative operation time or accumulative operation count for expendable parts or replacement parts such as a waste toner box exceeding a predetermined upper limit.

"ALL" represents a request of all apparatus statuses transmittable by the image forming apparatus 7.

The apparatus tag T3 is a tag showing that identification information of the image forming apparatus 7 of which the apparatus status has been requested is identified by the second element T4 described next.

The first example Ex1 is one example of the request message D1 in which the operation mode of the image forming apparatus 7 is requested as the apparatus status. Furthermore, the fourth example Ex4 is one example of the request message D1 in which the contents of the error of the image forming apparatus 7 is requested as the apparatus status.

In some cases, the request message D1 contains a reservation tag T5 and a third element T6. The reservation tag T5 is a tag showing that the apparatus information is requested to be transmitted at a timing indicated by the third element T6 described next.

The third element T6 in the second example Ex2 is an example in which a request cycle for the apparatus status is specified as seven days. Furthermore, the third element T6 in the third example Ex3 is an example in which the apparatus status is specified to be transmitted every week on Friday. The fifth example Ex5 is an example in which the apparatus status is specified to be transmitted every first Monday of the month.

The third elements T6 in the second example Ex2, the third example Ex3, and the fifth example Ex5 are each an example of information specifying the request cycle for the apparatus status.

In the sixth example Ex6, the request message D1 contains "ERROR" as a fourth element T7. The sixth example Ex6 is an example in which the request cycle is specified as one hour, and occurrence of the error is specified as contents identifying the apparatus status. The fourth element T7 is one example of information specifying the contents identifying the apparatus status.

The request message D1 in the sixth example Ex6 is a message requesting confirmation of the apparatus status of the image forming apparatus 7 at each of the request cycles specified by the third element T6. Furthermore, the request message D1 in the sixth example Ex6 is also a message requesting, when the status of the error has been received from the image forming apparatus 7, transmission of the status of the error to the mobile terminal 8.

When the CPU 11 determines that the request message D1 is not written in accordance with the writing rule, the CPU 11 repeats the process from step S1.

<Step S3>

When the CPU 11 determines that the request message D1 is written in accordance with the writing rule, the CPU 11 executes processes at, and subsequent to step S3. At step S3, the CPU 11 executes a registration authentication process based on supplementary information and the like in the request message D1.

The registration authentication process is a process of determining whether or not a transmission source of the request message D1 is a transmission source registered on the relay device 10 side in advance.

For example, the registration authentication process is conceivably a process of determining an authentication result by determining whether or not a telephone number of a transmission source contained in the supplementary information of the request message D1 is contained in registration data D01 stored in the storage portion 12 in advance. It should be noted that the telephone number contained in the supplementary information is one example of identification information identifying the transmission source of the request message D1.

When authentication has failed in the registration authentication process, the CPU 11 repeats the process from step S1.

<Step S4>

When the registration authentication process is successful, the CPU 11 executes processes at, and subsequent to step S4. At step S4, the CPU 11 determines whether or not the received request message D1 is a message with a reservation request. The message with the reservation request is the request message D1 in which the request cycle is specified. In the present embodiment, the request message D1 containing the reservation tag T5 and the third element T6 is the message with the reservation request.

<Step S5>

When the request message D1 is the message with the reservation request, the CPU 11 adds request contents of the request message D1 to periodical transmission job data D02 in the storage portion 12.

The periodical transmission job data D02 is data representing the contents of a periodical transmission job that should be conducted periodically in accordance with specified contents of the request message D1 specifying the request cycle. The periodical transmission job includes confirming the apparatus status of the specified image forming apparatus 7 in each of the request cycles, and transmitting the apparatus status corresponding to the confirmation result to the mobile terminal 8.

The periodical transmission job is a job that is automatically executed every time the timing of the specified request cycle has arrived, after the request message D1 with the reservation request is received and until the reservation request is cancelled.

If necessary, the CPU 11 adds the present date and time information to, in the periodical transmission job data D02, data of the periodical transmission job executed presently. The date and time information represents date and time of the latest execution of the periodical transmission job. The date and time information is used for determining the specified cycle when the specification of the request cycle is a specification of only a cycle but not containing information such as day of the week.

When the request message D1 is not the message with the reservation request, the CPU 11 skips the process at step S5 and executes processes at, and subsequent to step S6.

<Step S6>

Furthermore, the CPU 11 transmits a request command D2 corresponding to the request message D1 to the image forming apparatus 7 through the second communication portion 14 when the registration authentication process is successful.

It should be noted that the CPU 11 that is configured to execute the process at step S6 is one example of a request command transmission portion. The process at step S6 is achieved when the CPU 11 executes an apparatus status acquisition program Pr12 supporting the model of the image forming apparatus 7 to which the request command D2 is transmitted.

In the relay device 10, the registration data D01 in the storage portion 12 contains registered device information. The registered device information is information in which identification information of the image forming apparatus 7 corresponding to the second element T4 of the request message D1, model information of the image forming apparatus 7, and communication address of the image forming apparatus 7 along the second communication network 102 are associated.

The relay device 10 is preinstalled with the apparatus status acquisition program Pr12 that supports the model information of the image forming apparatus 7 in the registration data D01. The apparatus status acquisition program Pr12 is a program corresponding to the printer driver of each model.

By executing the apparatus status acquisition program Pr12, the relay device 10 can transmit a command requesting the apparatus status to the image forming apparatus 7 and receive information of the apparatus status transmitted as a response.

The CPU 11 transmits, to the image forming apparatus 7, the request command D2 requesting the apparatus information, by executing the apparatus status acquisition program Pr12 that supports the identification information of the image forming apparatus 7 specified in the request message D1.

However, when the time of transition to step S6 does not match the timing of the request cycle specified in the request message D1, the CPU 11 skips the processes at step S6 and the following steps S7 and S8.

In the image forming apparatus 7, the main control portion 71 receives the request command D2 through the communication portion 75. Furthermore, the main control portion 71 transmits, as a response and through the communication portion 75, an apparatus status information D3 representing its own apparatus status requested by the request command D2.

Thus, the main control portion 71, which is the transmission destination of the request command D2, receives the request command D2 and transmits, as a response, the apparatus status information D3 of its own. This process is achieved when the MPU 711 of the main control portion 71 executes an apparatus status response program Pr21.

<Step S7>

Furthermore, the CPU 11 receives, through the second communication portion 14, the apparatus status information D3 transmitted as a response from the image forming apparatus 7 in response to the transmission of the request command D2.

It should be noted that the CPU 11 that is configured to execute the process at step S7 is one example of a request information reception portion. The process at step S7 is achieved when the CPU 11 executes the apparatus status acquisition program Pr12.

<Step S8>

Furthermore, the CPU 11 transmits, to the mobile terminal 8 through the first communication portion 13, a report message D4 containing the apparatus status information D3 received from the image forming apparatus 7. The transmission destination of the report message D4 is the transmission source of the request message D1.

It should be noted that the CPU 11 that is configured to execute the process at step S8 is one example of a request information transmission portion. The process at step S8 is achieved when the CPU 11 executes the SMS program Pr11.

FIG. 7 shows one example of the report message D4 transmitted to the mobile terminal 8 in response to the request message D1 of the second example Ex2 in FIG. 6. The report message D4 in FIG. 7 contains the apparatus status information D3 regarding the remaining level of the developer.

After the processes of steps S4 to S8, the CPU 11 repeats the process from step S1. It should be noted that a process of cancelling the reservation request is omitted in FIG. 5. When the CPU 11 receives the request message D1 containing information requesting cancellation of the reservation request, the CPU 11 deletes data of the corresponding periodical transmission job in the periodical transmission job data D02.

In addition, the CPU 11 periodically refers to the periodical transmission job data D02, and determines whether or not the timing of the specified request cycle has arrived. Every time the timing of the specified request cycle arrives, the CPU 11 executes the periodical transmission job corresponding to the processes of steps S6 to S8.

Thus, in some cases, the request message D1 contains information specifying the request cycle for the apparatus status. In such cases, the CPU 11 that functions as the request command transmission portion transmits, to the image forming apparatus 7, the request command D2 in each of the request cycles specified by the request message D1.

Furthermore, when the request message D1 does not contain the fourth element T7, the CPU 11 that functions as the request information transmission portion transmits, every time the apparatus status information D3 is received from the image forming apparatus 7, the report message D4 containing the apparatus status information D3 to the mobile terminal 8.

Furthermore, in some cases, the request message D1 contains the request cycle and the fourth element T7. The fourth element T7 is one example of information specifying the contents identifying the apparatus status. Also in such cases, the CPU 11 that functions as the request command transmission portion transmits, to the image forming apparatus 7, the request command D2 in each of the request cycles specified by the request message D1.

Furthermore, when the request message D1 contains the fourth element T7, the CPU 11 that functions as the request information transmission portion transmits, only when an apparatus status having the identifying contents represented by the fourth element T7 is received from the image forming apparatus 7, the report message D4 containing the received apparatus status information D3 to the mobile terminal 8.

By employing the relay device 10 configured to execute the apparatus status relaying process, the user can acquire the apparatus status of the image forming apparatus 7 simply without using the local terminal 9 installed with the printer driver supporting the intended image forming apparatus 7.

In the present embodiment, the first communication portion 13 of the relay device 10 transmits and receives information to and from the mobile terminal 8 by using SMS communication. SMS is a communication service that can be used in most of the mobile terminals 8 having a telephone function, and is convenient since a mobile terminal 8 having a special function does not have to be prepared.

The relay device 10 has the function of transmitting the request command D2 and transmitting the report message D4 in each of the request cycles specified by the request message D1. With this, periodical control of the image forming apparatus 7 becomes easy.

Furthermore, the relay device 10 has the function of transmitting the request command D2 in each of the request cycles specified by the request message D1, and transmitting, only when the apparatus status with the identifying contents specified by the request message D1 is received, information of the apparatus status to the mobile terminal 8. With this, a response can be provided to emergencies such as when the error has occurred in the image forming apparatus 7, and a quick response such as supplying the supply material at an early stage becomes possible.

[Application Example]

In the embodiment described above, the relay device 10 may conceivably include multiple computers for executing the processes in a distributed manner. For example, the relay device 10 may be formed of multiple computers that can communicate with each other over a network such as the first LAN 1021.

It should be noted that, within the scope of the invention set forth in each claim, the relay device for the image forming apparatus according to the present disclosure can be formed by freely combining the embodiment and application example described above, or modifying or partially omitting the embodiment and application example as appropriate.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A relay device for an image forming apparatus, the device comprising:
    a first communication interface device configured to transmit and receive information through communication using short message service through a first communication network including a public wireless network;
    a second communication interface device configured to conduct communication through a second communication network which is different from the first communication network; and
    a processor configured to execute:
        a request message reception portion configured to receive a request message requesting information about an apparatus status of the image forming apparatus from a mobile terminal through the first communication interface device;
        an analyzing portion configured to analyze a plurality of tags and a plurality of elements corresponding to the plurality of tags to identify a type of the apparatus status and a request cycle for the apparatus status, the tags and elements being included in the request message, the request cycle being represented by a number of days, a number of hours, or a day of the week;
        a request command transmission portion configured to transmit a request command to the image forming apparatus through the second communication interface device in every request cycle specified by the request message, the request command requesting information corresponding to the type of the apparatus status identified by the analyzing portion;
        a request information reception portion configured to receive, through the second communication interface device, the information about the apparatus status transmitted as a response from the image forming apparatus in response to the transmitted request command; and
        a request information transmission portion configured to transmit, through the first communication interface device, the information about the apparatus status received from the image forming apparatus to the mobile terminal which is a transmission source of the request message.

2. The relay device for the image forming apparatus according to claim 1, the device further comprising an authentication portion configured to execute a registration authentication process to determine an authentication result by determining whether or not a telephone number of a transmission source of the request message is contained in registration data that has been registered in advance, wherein
    the request command transmission portion transmits the request command to the image forming apparatus only when the registration authentication process with regard to the request message is successful.

3. The relay device for the image forming apparatus according to claim 2, wherein
    the request information transmission portion is configured to transmit, every time information of the apparatus status is received from the image forming apparatus, the information of the apparatus status to the mobile terminal.

4. The relay device for the image forming apparatus according to claim 2, wherein
    when the request message contains information specifying a request cycle of the apparatus status and contents identifying the apparatus status, and
    the request information transmission portion is configured to transmit, only when the apparatus status with the identifying contents specified by the request message is received from the image forming apparatus, the information of the apparatus status to the mobile terminal.

* * * * *